United States Patent
Adachi

(10) Patent No.: US 8,980,417 B2
(45) Date of Patent: Mar. 17, 2015

(54) PROCESS FOR PRODUCTION OF GLASS FIBER FABRIC HAVING SILICA MICROPARTICLES ADHERED THEREON, GLASS FIBER FABRIC HAVING SILICA MICROPARTICLES ADHERED THEREON, AND FIBER-REINFORCED MOLDED RESIN ARTICLE

(75) Inventor: Kazutaka Adachi, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 13/639,249

(22) PCT Filed: Mar. 2, 2011

(86) PCT No.: PCT/JP2011/054784
§ 371 (c)(1),
(2), (4) Date: Oct. 24, 2012

(87) PCT Pub. No.: WO2011/125396
PCT Pub. Date: Oct. 13, 2011

(65) Prior Publication Data
US 2013/0045373 A1 Feb. 21, 2013

(30) Foreign Application Priority Data
Apr. 5, 2010 (JP) .............................. P2010-087045

(51) Int. Cl.
*A61F 13/15* (2006.01)
*C03C 17/00* (2006.01)
(Continued)

(52) U.S. Cl.
CPC ................ *C03C 25/42* (2013.01); *B29B 15/08* (2013.01); *D03D 1/0082* (2013.01); *D03D 15/0011* (2013.01); *C03C 2217/213* (2013.01); *D10B 2505/02* (2013.01); *Y10S 428/901* (2013.01)

USPC ............... 428/219; 65/35; 65/60.53; 65/444; 442/180; 428/901; 174/255; 174/259

(58) Field of Classification Search
CPC ...... B29B 15/122; B29B 15/10; B29B 15/08; H05K 1/0366; H05K 2201/0209; D03D 1/0082; C03C 25/42; C03C 25/46; C03C 2203/34; C03C 2217/213; D10B 2505/02
USPC .................. 428/219, 901; 65/35, 60.53, 444; 442/180; 174/259, 255
See application file for complete search history.

(56) References Cited

U.S. PATENT DOCUMENTS 4,430,384 A * 2/1984 George ..................... 428/377
5,648,407 A   7/1997 Goetz et al.
(Continued)

FOREIGN PATENT DOCUMENTS

CN   1608100 A   4/2005
CN   101484628 A   7/2009
(Continued)

OTHER PUBLICATIONS

Search Report issued in corresponding International Application No. PCT/JP2011/054784 dated Jun. 7, 2011.
Office Action issued in counterpart Chinese Patent Application No. 201180016491.3 dated Nov. 14, 2013.

*Primary Examiner* — Aaron Austin
*Assistant Examiner* — Jasper Saberi
(74) *Attorney, Agent, or Firm* — Morgan, Lewis & Bockius LLP

(57) ABSTRACT

A production process for producing a glass fiber fabric that has good smoothness and is excellent in resin impregnation property is provided wherein glass fiber yarns are woven to obtain a glass fiber fabric.

10 Claims, 1 Drawing Sheet

(51) Int. Cl.
*C03B 35/00* (2006.01)
*D03D 1/00* (2006.01)
*C03C 25/42* (2006.01)
*B29B 15/08* (2006.01)
*D03D 15/00* (2006.01)

(56) References Cited

U.S. PATENT DOCUMENTS 6,569,513 B2 * 5/2003 Yamaji et al. .................. 428/209
7,238,402 B2 * 7/2007 Swales et al. .................... 428/70
7,832,983 B2   11/2010 Kruckenberg et al.

FOREIGN PATENT DOCUMENTS

| | | | |
|---|---|---|---|
| EP | 1457515 | A1 | 9/2004 |
| JP | H03-008861 | A | 1/1991 |
| JP | H06-248572 | A | 9/1994 |
| JP | 11117168 | A * | 4/1999 |
| JP | H11-117168 | A | 4/1999 |
| JP | H11-505567 | A | 5/1999 |
| JP | 2007-031871 | A | 2/2007 |
| JP | 2007-303009 | A | 11/2007 |
| JP | 2011-178992 | A | 9/2011 |

* cited by examiner

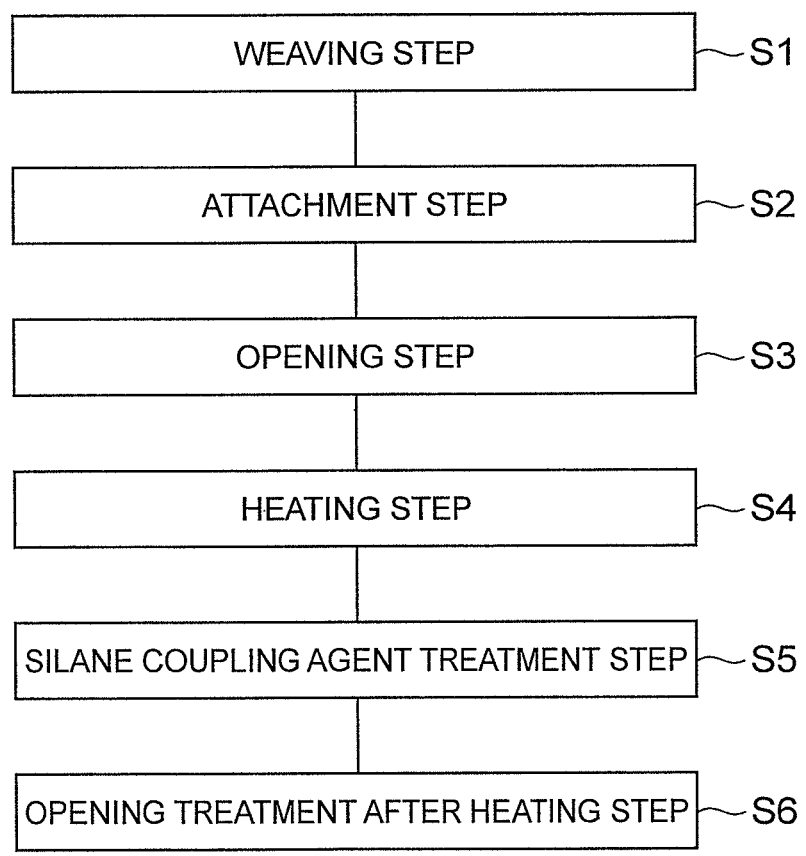

PROCESS FOR PRODUCTION OF GLASS FIBER FABRIC HAVING SILICA MICROPARTICLES ADHERED THEREON, GLASS FIBER FABRIC HAVING SILICA MICROPARTICLES ADHERED THEREON, AND FIBER-REINFORCED MOLDED RESIN ARTICLE

TECHNICAL FIELD

The present invention relates to a process for the production of a glass fiber fabric having silica microparticles adhered thereon that is excellent in resin impregnation property by adhering silica microparticles, a glass fiber fabric having silica microparticles adhered thereon, and a fiber-reinforced molded resin article.

BACKGROUND ART

In recent years, fiber-reinforced molded resin articles comprising a glass fiber fabric as a reinforcing material and comprising an epoxy resin or the like as a matrix resin have been widely used for printed boards, transparent sheet materials, and the like. Recently, with the miniaturization and weight reduction of electronic equipment, the requirement of the thinning of fiber-reinforced molded resin articles has become strong. For the thinning of fiber-reinforced molded resin articles, it is preferable to use a glass fiber fabric in which mass is small and thickness is thin, and it is preferable to uniformly dispose a glass fiber fabric in which weaving yarns (filaments) of glass fibers are widened, in a fiber-reinforced molded resin article and smooth it. Further, in order to further increase the CAF (Conductive Anodic Filament) resistance of printed boards, the transparency of transparent sheets, and the like, a further improvement in the resin impregnation property of glass fiber fabrics is required.

Therefore, conventionally, it has been considered that a fiber-opening treatment for glass fiber fabrics and the provision of silica microparticles to glass fiber fabrics are performed in order to improve the smoothness and resin impregnation property of the glass fiber fabrics. For example, a process of removing a sizing agent attached on glass fibers by a heat treatment, then immersing a glass fiber fabric in an aqueous dispersion of silica microparticles to provide a surface treatment, and then providing a fiber-opening treatment is described in Patent Literature 1. In addition, a process of removing a sizing agent attached on glass fibers by a heat treatment and then providing a fiber-opening treatment to a glass fiber fabric in an aqueous dispersion of silica microparticles is described in Patent Literature 2. By attaching silica microparticles on a glass fiber fabric using the processes described in Patent Literature 1 and Patent Literature 2, in this manner, certain resin impregnation property can be improved.

CITATION LIST

Patent Literature

Patent Literature 1: Japanese Patent Application Laid-Open No. 06-248572
Patent Literature 2: Japanese Patent Application Laid-Open No. 11-117168

SUMMARY OF INVENTION

Technical Problem

However, as applications for reinforcing materials utilized for thin fiber-reinforced molded resin articles, further improvements in the resin impregnation property, smoothness, and appearance properties of glass fiber fabrics are required.

In other words, in the process described in Patent Literature 1, the fiber-opening treatment is provided after the heat treatment is performed, and therefore, the bonding, partial fusion, and the like of glass filaments caused by the heat treatment may hinder improvements in resin impregnation property and smoothness.

In addition, in the process described in Patent Literature 2, in the fiber-opening treatment, the silica microparticles are collided with the glass fiber fabric, and therefore, stress applied to the glass fiber fabric increases. Therefore, problems in appearance, such as bowed filling, may occur, and particularly, in the case of a thin glass fiber fabric, the occurrence of the problems is significant.

Therefore, the present invention has been made in view of the above problems, and it is an object of the present invention to provide a process for the production of a glass fiber fabric having silica microparticles adhered thereon which is excellent in any of resin impregnation property, smoothness, and appearance properties and in which resin impregnation property are stably maintained, a glass fiber fabric having silica microparticles adhered thereon, and a fiber-reinforced molded resin article.

Solution to Problem

A process for the production of a glass fiber fabric having silica microparticles adhered thereon according to the present invention is a process for production of a glass fiber fabric having silica microparticles adhered thereon in which silica microparticles are attached or fused on glass filament surfaces of a glass fiber fabric to adhere the silica microparticles, comprising an attachment step of immersing the glass fiber fabric in which a sizing agent is attached on the glass filaments, in an aqueous dispersion of silica microparticles to attach the silica microparticles on the glass filament surfaces of the glass fiber fabric; a fiber-opening step of providing a fiber-opening treatment to the glass fiber fabric on which the silica microparticles are attached by the attachment step; and a heating step of heat-treating the glass fiber fabric to which the fiber-opening treatment is provided by the fiber-opening step, to fuse some or all of the silica microparticles attached by the attachment step, on the glass filament surfaces of the glass fiber fabric.

According to the process for the production of a glass fiber fabric having silica microparticles adhered thereon according to the present invention, when the glass fiber fabric is immersed in the aqueous dispersion of silica microparticles by the attachment step, surprisingly, the silica microparticles enter between the glass filaments and attach on the glass filaments without large external force, and function as spacers.

Therefore, when, after the attachment step, the fiber-opening step is performed to provide a fiber-opening treatment to the glass fiber fabric, the sizing agent functions as a lubricant, and the fiber-opening effect of the glass fiber fabric is promoted. Moreover, the sizing agent prevents a large displacement of the glass filaments, and therefore, the occurrence of bowed filling in the glass fiber fabric in the fiber-opening step is suppressed. Therefore, the smoothness of the glass fiber fabric having silica microparticles adhered thereon produced by the production process of the present invention improves, and appearance properties improve.

In addition, when, after the attachment step, the heating step is performed to heat-treat the glass fiber fabric, some or all of the silica microparticles fuse on the glass filaments, and therefore, clearances are ensured between the glass filaments. Impregnation with a resin is promoted by the ensured clearances between the glass filaments, and therefore, the resin impregnation property of the glass fiber fabric having silica microparticles adhered thereon produced by the production process of the present invention improves. Further, since the silica microparticles fuse on the glass filaments, the clearances ensured between the glass filaments are maintained, and therefore, resin impregnation property is stably maintained.

Moreover, by performing the attachment step and the fiber-opening step before the heating step, the silica microparticles can be attached on the glass filaments, and the glass fiber fabric can be opened, without the influence of the bonding and the like of the glass filaments due to the heating of the glass fiber fabric.

Further, in the present invention, the attachment step and the fiber-opening step are separately performed, and therefore, independent optimal temperature control can be performed. Therefore, in the attachment step, by decreasing the temperature of the liquid, the aggregation of the silica microparticles accompanying an increase in liquid temperature is prevented, and soil on the glass fiber fabric due to aggregates of the silica microparticles can be prevented. On the other hand, in the fiber-opening step, by increasing the temperature of the liquid, lubrication function by the sizing agent improves, and fiber-opening efficiency can be improved. Moreover, in the fiber-opening step, the fiber-opening treatment is provided without the silica microparticles, and therefore, it is possible to suppress stress applied to the glass fiber fabric and suppress the occurrence of bowed filling and flaws in the glass fiber fabric. Therefore, the appearance properties of the glass fiber fabric having silica microparticles adhered thereon produced by the production process of the present invention can be improved.

In the process for the production of a glass fiber fabric having silica microparticles adhered thereon according to the present invention, it is preferable that a fusion rate of the silica microparticles in the glass fiber fabric having silica microparticles adhered thereon is 60% or more. The silica microparticles that the glass fiber fabric having silica microparticles adhered thereon adheres are fused on the glass filaments, and therefore, the detachment of the silica microparticles contributing to resin impregnation property is suppressed, and resin impregnation property is more reliably maintained. Thus, the glass fiber fabric having silica microparticles adhered thereon can also be suitably used as a reinforcing material for a thin fiber-reinforced molded resin article for which high properties are required.

In addition, in the process for the production of a glass fiber fabric having silica microparticles adhered thereon according to the present invention, it is preferable that as the fiber-opening treatment, at least one of a fiber-opening treatment with a water jet, a fiber-opening treatment with a vibrowasher, and a fiber-opening treatment with an ultrasonic wave is provided. By using these fiber-opening treatments, the excellent smoothness of the glass fiber fabric having silica microparticles adhered thereon obtained by the production process of the present invention is ensured.

In addition, in the process for the production of a glass fiber fabric having silica microparticles adhered thereon according to the present invention, it is preferable that a mass per unit area of the glass fiber fabric having silica microparticles adhered thereon is 110 g/m² or less. By setting the mass per unit area to 110 g/m² or less, it is possible to thin the thickness of the glass fiber fabric and improve resin impregnation property. Thus, the glass fiber fabric having silica microparticles adhered thereon can be used for a reinforcing material for a thin fiber-reinforced molded resin article.

A glass fiber fabric having silica microparticles adhered thereon according to the present invention is a glass fiber fabric having silica microparticles adhered thereon in which silica microparticles are attached or fused on glass filament surfaces of a glass fiber fabric to adhere the silica microparticles.

According to the glass fiber fabric having silica microparticles adhered thereon according to the present invention, the silica microparticles that the glass fiber fabric having silica microparticles adhered thereon adheres are fused on the glass filaments, and therefore, the detachment of the silica microparticles contributing to resin impregnation property is suppressed, and resin impregnation property is more reliably maintained. Thus, the glass fiber fabric having silica microparticles adhered thereon can be used as a reinforcing material for a thin fiber-reinforced molded resin article for which high properties are required.

In the glass fiber fabric having silica microparticles adhered thereon according to the present invention, it is preferable that a mass per unit area of the glass fiber fabric having silica microparticles adhered thereon is 110 g/m² or less. By decreasing the mass per unit area to 110 g/m² or less in this manner, it is possible to thin the thickness of the glass fiber fabric and improve resin impregnation property. Thus, the glass fiber fabric having silica microparticles adhered thereon can be used for a reinforcing material for a thin fiber-reinforced molded resin article.

In addition, in the glass fiber fabric having silica microparticles adhered thereon according to the present invention, it is preferable that a mass per unit area, X g/m², and air permeability, Y cm³·cm⁻²·s⁻¹, of the glass fiber fabric having silica microparticles adhered thereon satisfy a condition of $0 < X \times (Y)^{1/2} \leq 300$. When the mass per unit area of the glass fiber fabric is small, its air permeability tends to increase, but by satisfying the above condition, excellent smoothness can be obtained.

A fiber-reinforced molded resin article according to the present invention is one in which any of the above glass fiber fabrics having silica microparticles adhered thereon is used as a reinforcing material, this is impregnated with a resin, and the resin is cured.

As described above, the glass fiber fabric having silica microparticles adhered thereon that is the reinforcing material for the fiber-reinforced molded resin article is excellent in resin impregnation property, smoothness, and appearance properties, and therefore can be utilized for thin printed boards, transparent sheets, display materials, or the like. The resin used is not particularly limited, and examples of the resin include the following.

Examples of thermosetting resins for printed board applications include epoxy resins, thermosetting modified polyphenylene ether resins, thermosetting polyimide resins, urea resins, allyl resins, silicon resins, benzoxazine resins, phenolic resins, unsaturated polyester resins, bismaleimide triazine resins, alkyd resins, furan resins, melamine resins, polyurethane resins, and aniline resins.

In addition, examples of thermoplastic resins for printed board applications include polyphenylene ether resins, functional group-modified polyphenylene ether resins, alicyclic hydrocarbon resins, thermoplastic polyimide resins, polyether ether ketone (PEEK) resins, polyether sulfone resins, polyamideimide resins, polyesterimide resins, polyester resins, polyolefin resins, polystyrene resins, polyamide resins, polyvinyl acetal resins, polyvinyl alcohol resins, polyvinyl acetate resins, poly(meth)acrylate resins, and polyoxymethylene resins.

On the other hand, examples of thermosetting resins for transparent sheet and display material applications include epoxy resins, phenolic resins, melamine resins, and polyester resins.

In addition, examples of thermoplastic resins for transparent sheet and display material applications include polyethylene, polypropylene, polymethyl methacrylate, polycarbonate, polytetrafluoroethylene, polyvinyl chloride, polyvinylidene chloride, polyether sulfone, polyphenylene oxide, or blends or block or graft copolymers thereof In the present invention, a glass fiber fabric having silica microparticles adhered thereon refers to a glass fiber fabric in which silica microparticles are attached or fused on the glass filament surfaces of the glass fiber fabric to adhere the silica microparticles. In addition, a glass fiber fabric having silica microparticles adhered thereon means a glass fiber fabric in which silica microparticles are fused on the glass filament surfaces of the glass fiber fabric to adhere the silica microparticles, when particularly specified. Here, a glass fiber fabric is a fabric obtained by weaving glass fiber yarns.

In addition, in the present invention, a glass fiber yarn refers to one in which a plurality of glass filaments are bundled. In the present invention, the weight of a sizing agent and silica microparticles attached or fused is not included in the weight of glass fiber yarns.

In addition, in the present invention, silica microparticles being fused on glass filament surfaces refers to, as a result of a heat treatment, silica microparticles being in a state in which some of the silica microparticles melt and are fixed on one or two or more glass filament surfaces and being in a state in which the silica microparticles do not detach from the glass filaments. On the other hand, silica microparticles being attached on glass filament surfaces refers to silica microparticles being in a state in which the silica microparticles are bonded on one or two or more glass filament surfaces mainly by electrostatic interaction and being in a state in which the silica microparticles may detach from the glass filaments by receiving an impact or the like.

In addition, in the present invention, glass filament outer surfaces in contact with outside air or the like, and glass filament gap surfaces surrounded by a plurality of glass filaments are included in glass filament surfaces.

Advantageous Effects of Invention

According to the present invention, a glass fiber fabric which is excellent in any of resin impregnation property, smoothness, and appearance properties and in which resin impregnation property are stably maintained can be produced. Thus, the thinning of fiber-reinforced molded resin articles can be promoted, and the CAF resistance of printed boards and the transparency of transparent sheets can be improved.

BRIEF DESCRIPTION OF DRAWINGS

FIG. 1 is a diagram showing one example of steps carried out in a process for the production of a glass fiber fabric having silica microparticles adhered thereon according to an embodiment.

DESCRIPTION OF EMBODIMENTS

An embodiment of a process for the production of a glass fiber fabric having silica microparticles adhered thereon, a glass fiber fabric having silica microparticles adhered thereon, and a fiber-reinforced molded resin article according to the present invention will be described below in detail with reference to the drawing.

FIG. 1 is a diagram showing one example of steps carried out in a process for the production of a glass fiber fabric having silica microparticles adhered thereon according to this embodiment. As shown in FIG. 1, the process for the production of a glass fiber fabric having silica microparticles adhered thereon according to this embodiment is composed of a weaving step of step S1, an attachment step of step S2, a fiber-opening step (first fiber-opening step) of step S3, a heating step of step S4, a silane coupling agent treatment step of step S5, and a fiber-opening step after the heating step (second fiber-opening step) of step S6. Each step will be described below in detail.

First, in the weaving step of step S1, glass fiber yarns prepared by bundling glass filaments are woven to obtain a glass fiber fabric.

The glass composition of the glass filaments is not particularly limited, and examples of the glass composition include E-glass, low dielectric constant glass, or high elastic modulus glass.

The filament diameter of the glass filament is not particularly limited and is preferably 10 μm or less, more preferably 8 μm or less, and further, particularly preferably 3 to 5 μm for applications for reinforcing materials for thin fiber-reinforced molded resin articles.

The glass fiber yarn forming the glass fiber fabric is preferably formed by 25 to 500 glass filaments being bundled, and is more preferably formed by 40 to 300 glass filaments being bundled. In this description, "a lower limit value to an upper limit value" means being in the range of a lower limit value or more and an upper limit value or less.

The count of the glass fiber yarn is preferably 0.8 to 135 tex, more preferably 1 to 25 tex. The count (tex) of the glass fiber yarn corresponds to the mass of the glass fiber per 1000 m (unit: g).

In the weaving step, a sizing agent is used for the convergence of the glass filaments, the warping of the warp, and the like. Examples of this sizing agent include sizing agents in which a film-forming agent component is starch or PVA (polyvinyl alcohol). The sizing agent may comprise an oil agent, a softening agent, or the like.

For the attachment amount of the sizing agent in the glass fiber fabric, the attachment amount of the sizing agent is preferably 0.1 to 3 parts by mass, more preferably 0.5 to 1.5 parts by mass, with respect to 100 parts by mass of the glass fiber yarns. The range of the attachment amount of the sizing agent described above, or the attachment amount of the sizing agent when not particularly specified represents the average of the attachment amount of the sizing agent with respect to the warp or the weft.

The process of weaving is not particularly limited, and examples of the process of weaving include plain weave, sateen weave, and twill weave. Weaving density in the weaving of the glass fiber yarns is not particularly limited, and is, for example, preferably 10 to 150 yarns/25 mm, more preferably 40 to 100 yarns/25 mm The glass fiber fabric woven in this manner preferably has a mass per unit area of 110 g/m$^2$ or less, more preferably 50 g/m$^2$ or less, in terms of applications for reinforcing materials for thin fiber-reinforced molded resin articles. On the other hand, in terms of weaving properties, the mass per unit area of the glass fiber fabric is preferably 8 g/m$^2$ or more. The mass per unit area of the glass fiber fabric is a value also including the mass of the attached sizing agent. Here, the mass per unit area of the glass fiber fabric reflects the thickness of the glass fiber fabric, and for example, when the mass per unit area is 50 g/m², its thickness is about 50 μm.

Next, in the attachment step of step S2, the glass fiber fabric is immersed in an aqueous dispersion of silica microparticles to attach the silica microparticles on the glass filament surfaces of the glass fiber fabric. In this embodiment, the glass fiber fabric obtained by the attachment step is also referred to as a fabric having silica microparticles attached thereon.

The attachment amount of the silica microparticles attached on the glass fiber fabric in the attachment step is preferably 0.001 to 1 part by mass of the silica microparticles, more preferably 0.01 to 1 part by mass of the silica microparticles, with respect to 100 parts by mass of the glass fiber yarns. The attachment amount of the silica microparticles can be obtained, for example, by observing and measuring the number of silica microparticles that the glass fiber fabric adheres on the glass filament surfaces by an SEM (Scanning Electron Microscope).

The aqueous dispersion of silica microparticles is a colloidal solution in which silica microparticles having a volume average particle diameter of 40 to 400 nm, preferably 60 to 300 nm, more preferably 80 to 200 nm, and particularly preferably 100 to 150 nm are dispersed in water. The silica microparticles contained in the aqueous dispersion of silica microparticles may be one type or a combination of two or more types. Silica microparticles having the particle diameter described above can easily enter between the glass filaments and effectively function as spacers. If the particle diameter is too large, it is difficult for the silica microparticles to enter between the glass filaments, and on the other hand, if the particle diameter is too small, the silica microparticles do not function as spacers.

The proportion of the mass of the silica microparticles with respect to the solution is preferably 0.01 to 5% by mass, more preferably 0.1 to 2% by mass. A large amount of the silica microparticles are contained in the solution, and thus, the silica microparticles are easily attached on the glass filament surfaces. On the other hand, if the proportion of the mass of the silica microparticles with respect to the solution increases to more than 5% by mass, the silica microparticles aggregate easily, and the aggregates of the silica microparticles may attach on the fabric having silica microparticles attached thereon and become soil.

The liquid temperature of the aqueous dispersion of silica microparticles is preferably 10 to 40° C. It is preferable that the liquid temperature is higher because the motion of the silica microparticles in the aqueous dispersion of silica microparticles is active, and in terms of the attachment of the silica microparticles. On the other hand, if the liquid temperature is set higher than 40° C., the silica microparticles aggregate easily due to intermolecular interaction, and the aggregates of the silica microparticles may attach on the fabric having silica microparticles attached thereon and become soil.

The immersion in the aqueous dispersion of silica microparticles is performed by passing the glass fiber fabric through a silica microparticle attachment vessel in which the aqueous dispersion of silica microparticles is stored. At this time, tension applied in the movement direction of the glass fiber fabric is not particularly limited, and is, for example, preferably 50 to 300 N per unit width. The unit width means unit length expressed in meters (m) in the width direction of the glass fiber fabric, that is, a weft direction.

Time required to pass the glass fiber fabric through the silica microparticle attachment vessel is not particularly limited as long as the above-described attachment amount of the silica microparticles are attached, and the time is, for example, preferably 1 to 4 seconds.

In addition, in the attachment step, it is preferable to dispose one or a plurality of widening rollers extending in a direction orthogonal to the movement direction of the glass fiber fabric, in the silica microparticle attachment vessel, and move the glass fiber fabric while bending the glass fiber fabric by the widening rollers in the aqueous dispersion of silica microparticles. Here, bending refers to the glass fiber fabric curving along the outer peripheral surface of the widening roller, that is, a certain area of the glass fiber fabric being in contact with the outer peripheral surface of the widening roller. In addition, the widening roller is a member that generates tension in the glass fiber fabric in the movement direction and a lateral direction when bending the glass fiber fabric, and its shape is not particularly limited. The fiber yarns are widened by tension applied by the widening roller, and the silica microparticles easily enter between the glass filaments.

The number of the widening rollers and the number of times of bending the glass fiber fabric, depending on the number of the widening rollers, are not particularly limited, and for example, it is preferable to dispose two widening rollers in the silica microparticle attachment vessel and bend the glass fiber fabric twice in the aqueous dispersion of silica microparticles.

It is preferable that the one or plurality of widening rollers are disposed in the silica microparticle attachment vessel so that a minor angle that the glass fiber fabric forms by being bended by one widening roller is 60 to 120 degrees. Here, if the minor angle is less than 60 degrees, stress applied to the glass fiber fabric is too large. On the other hand, if the minor angle is larger than 120 degrees, the glass fiber fabric is not sufficiently widened.

When the above treatment is performed, and the attachment step of step S2 is completed, for example, the fabric having silica microparticles attached thereon is inserted between a pair of opposed rollers to perform the squeezing of the fabric having silica microparticles attached thereon, and then, the fiber-opening step of step S3 is performed.

Next, in the fiber-opening step of step S3, a fiber-opening treatment is provided to the fabric having silica microparticles attached thereon to widen the warp and weft of the fabric having silica microparticles attached thereon. In this embodiment, the glass fiber fabric obtained by the fiber-opening step is also referred to as a fiber-opened fabric.

As the fiber-opening treatment, for example, a fiber-opening treatment with a water jet, a fiber-opening treatment with a vibrowasher, a fiber-opening treatment with an ultrasonic wave, or the fiber-opening treatment of pressing by a bar is performed. For the fiber-opening treatment, any of the above treatments may be performed, and the fiber-opening treatment with a vibrowasher and the fiber-opening treatment with an ultrasonic wave, which have a high fiber-opening effect, are more preferable. For the fiber-opening treatment, these treatments may be performed alone, or these treatments may be performed in combination.

The fiber-opening treatment with a water jet is a treatment in which a liquid is jetted toward the fabric having silica microparticles attached thereon to open the fabric having silica microparticles attached thereon, and examples of the fiber-opening treatment with a water jet include a treatment in which a spray water flow is jetted to the fabric having silica microparticles attached thereon from a nozzle having a divergence angle, and a treatment in which columnar flowing water is jetted to the fabric having silica microparticles attached thereon from a group of nozzles having pores.

Examples of the liquid used for the water jet include water or organic solvents, such as alcohols, and the liquid is preferably water.

The jet pressure of the liquid is preferably 0.1 to 2 MPa, more preferably 0.5 to 1 MPa. By setting the jet pressure of the liquid to 0.5 to 1 MPa, defects in appearance in the fabric having silica microparticles attached thereon are suppressed, and the fiber-opening effect of the fabric having silica microparticles attached thereon increases.

The fiber-opening treatment with a vibrowasher is a treatment in which the fabric having silica microparticles attached thereon is opened using a vibrowasher (see Patent Literature 1 or 2).

In the fiber-opening treatment with a vibrowasher, in a vessel in which a liquid is stored, the fabric having silica microparticles attached thereon is pressed against a cylindrical body in which a large number of small holes are formed, and the pressure wave of the liquid is emitted from the small holes. Then, the fabric having silica microparticles attached thereon is opened by the pressing and the pressure wave on the cylindrical body.

Examples of the liquid used for the vibrowasher include water or organic solvents, such as alcohols. Among them, water is preferable, and a slight amount (less than 0.01% by mass) of silica microparticles may be contained. Here, if 0.01% by mass or more of silica microparticles are present with respect to the solution (water), problems in appearance, such as aggregates of the silica microparticles attaching on the glass fiber fabric and becoming soil, may occur.

The frequency of the pressure wave generated by the vibrowasher is preferably 50 to 600 Hz, more preferably 100 to 300 Hz. By setting this frequency of the pressure wave to 100 to 300 Hz, defects in appearance in the glass fiber fabric are suppressed, and the fiber-opening effect increases.

The fiber-opening treatment with an ultrasonic wave is a treatment in which the fabric having silica microparticles attached thereon is opened by providing an ultrasonic wave using an ultrasonic vibrator with a liquid or a gas as a medium.

The medium may be either of a liquid and a gas, and a liquid is preferable. Examples of this liquid include water or organic solvents, such as alcohols, and this liquid is preferably water. A slight amount (less than 0.01% by mass) of silica microparticles may be contained in this liquid. Here, if 0.01% by mass or more of silica microparticles are present with respect to the solution, problems in appearance, such as aggregates of the silica microparticles attaching on the glass fiber fabric and becoming soil, may occur.

Other than the liquid that is the medium, a partition or the like may be disposed between the ultrasonic vibrator and the fabric having silica microparticles attached thereon, and distance between the ultrasonic vibrator and the glass fiber fabric is preferably 1 to 20 cm.

The frequency of the ultrasonic wave that the ultrasonic vibrator generates is preferably 10 to 60 kHz, more preferably 30 to 50 kHz. By setting the frequency of the ultrasonic wave to 30 to 50 kHz, defects in appearance in the glass fiber fabric are suppressed, and the fiber-opening effect increases.

In the fiber-opening treatment of pressing by a bar, the fabric having silica microparticles attached thereon is opened by pressing a rod-shaped bar against the fabric having silica microparticles attached thereon in a liquid. The shape of the bar, and the presence or absence of rotation are not particularly limited.

The temperature of the liquid used in each fiber-opening treatment in the fiber-opening step is preferably 50° C. or more, more preferably 60° C. or more. At a temperature of 50° C. or more, a lubricant component in the sizing agent remaining on the fabric having glass microparticles attached thereon liquefies, and therefore, the fiber-opening effect increase. Further, at a temperature of 60° C. or more, the film-forming agent component in the sizing agent swells or gelatinizes, and therefore, lubricity between the glass filaments improves, the widening of the warp and the weft by the fiber-opening treatment is easier, and the fiber-opening effect increases further. In terms of the workability of the fiber-opening treatment, the temperature of the liquid is preferably 95° C. or less.

When the above treatment is performed, and the fiber-opening step of step S3 is completed, for example, first, the fiber-opened fabric is passed through a washing vessel in which water is stored, next, the front and back surfaces of the fiber-opened fabric are washed by a washing shower, next, the fabric having silica microparticles attached thereon is inserted between a pair of opposed rollers to perform the squeezing of the fiber-opened fabric, and then, the heating step of step S4 is performed.

Next, in the heating step of step S4, the fiber-opened fabric is heat-treated in a heating furnace or the like to fuse some or all of the silica microparticles attaching on the fiber-opened fabric, on the glass filament surfaces. In this embodiment, the glass fiber fabric obtained by the heating step is also referred to as a glass fiber fabric having silica microparticles adhered thereon.

The temperature of the heating of the fiber-opened fabric in the heat treatment is, for example, 300 to 450° C. In addition, the time of the heating of the fiber-opened fabric in the heat treatment is 36 to 72 hours.

Then, the sizing agent attaching on the glass fiber fabric is removed by this heat treatment.

A phenomenon in which the glass filaments contact together, and further, some of the glass filaments soften and adjacent glass filaments partially fuse together may occur by the heat treatment in the heating step.

Due to this phenomenon, when the attachment step or a step similar to this is performed after the heating step as conventionally performed, the silica microparticles are allowed to enter between the glass filaments after some glass filaments contact or fuse together. Therefore, even if the attachment step or a step similar to this is performed after the heating step, the amount of the silica microparticles present between the glass filaments is insufficient, and the extent of resin impregnation property improvement due to the adhesion of the silica microparticles decreases.

In addition, when the fiber-opening step or a step similar to this is first performed after the heating step as conventionally performed, clearances between the glass filaments are widened after some glass filaments contact or fuse together. Therefore, even if the fiber-opening step or a step similar to this is first performed after the heating step, the effect of widening clearances between the glass filaments decreases. Further, in the heating step, which is a step before the fiber-opening step, the sizing agent functioning as a lubricant is removed by the heat treatment, and therefore, in the fiber-opening step, which is a step after the heating step, the fiber-opening effect of the glass fiber fabric decreases further. Moreover, since the sizing agent is removed by the heating step, large displacement occurs easily in the glass fiber yarns, and depending on the type of the fiber-opening treatment provided after the heating step, defects in appearance, such as bowed filling, may occur easily.

On the other hand, in this embodiment, the attachment step is performed before the heating step, thereby contributing to an improvement in the resin impregnation property of the glass fibers. In other words, the silica microparticles can be allowed to enter between the glass filaments before the glass filaments bond or fuse together. Therefore, the silica microparticles sufficiently enter between the glass filaments by the attachment step, clearances between the glass filaments are ensured, and resin impregnation property improves.

In addition, in this embodiment, the fiber-opening step is performed before the heating step, thereby contributing to an improvement in smoothness. In other words, clearances between the glass filaments can be widened before the glass filaments bond or fuse together, and therefore, the fiber-opening effect of the fiber-opening step is not weakened by the influence of the bonding and fusion of the glass filaments caused by the heat treatment. Further, in the fiber-opening step, the sizing agent is not removed and remains on the glass fiber yarns, and therefore, this sizing agent functions as a lubricant, contributing to excellent smoothness.

In addition, in this embodiment, the fiber-opening step is performed before the heating step, thereby contributing to excellent appearance properties. In other words, in the fiber-opening step, the sizing agent is not removed and remains on the glass fiber yarns, and therefore, a large displacement of the glass fiber yarns is prevented, and the occurrence of defects in appearance, such as bowed filling, in the fiber-opening step is suppressed.

In addition, in this embodiment, the attachment step is performed before the heating step, thereby contributing to excellent appearance properties. In other words, in the attachment step, which is a step before the heating step, the silica microparticles enter between the glass filaments, and clearances between the glass filaments are ensured, and therefore, even if the heat treatment is performed in the heating step, the bonding and fusion of the glass filaments can be suppressed. Thus, even if the fiber-opening treatment is further provided after the heating step, its fiber-opening effect is not lessened.

In addition, in this embodiment, the attachment step is performed after the weaving step, thereby contributing to high resin impregnation property. In other words, when the silica microparticles are attached on the glass fiber yarns before the weaving step, the silica microparticles may fall off, or the silica microparticles may aggregate and not be uniformly adhered in the glass fiber fabric, due to an impact or the like received in the weaving step. In these cases, excellent resin impregnation property due to the silica microparticles may decrease, and according to this embodiment, this possibility of a decrease in resin impregnation property can be avoided.

In addition to these, in this embodiment, the heating step is performed after the attachment step, thereby contributing to stably maintaining resin impregnation property. In other words, most of the silica microparticles attached on the glass filament surfaces by the attachment step fuse on the glass filament surfaces by the heat treatment in the heating step. Thus, the detachment of the silica microparticles is prevented, and excellent resin impregnation property due to the silica microparticles is inhibited from decreasing.

In addition, in this embodiment, the attachment step and the fiber-opening step are separated, thereby contributing to excellent appearance properties. Particularly, independent liquid temperature control in each step, which is possible by separating the attachment step and the fiber-opening step, can prevent soil due to silica aggregates from attaching on the glass fiber fabric.

Specifically, when the fiber-opening treatment of the glass fiber fabric is performed in a dispersion of silica microparticles to simultaneously perform the attachment step and the fiber-opening step, as conventionally performed, the liquid temperature of the aqueous dispersion of silica microparticles tends to increase. Particularly, when the fiber-opening treatment with a vibrowasher is provided, an increase in liquid temperature is significant. Thus, the liquid temperature increases to a temperature at which the aggregation of the silica microparticles occurs, and generated silica microparticle aggregates may attach on the glass fiber fabric and become soil.

On the other hand, in this embodiment, it is possible to independently control liquid temperature at optimal temperature in the attachment step and the fiber-opening step, and therefore, it is possible to prevent the aggregation of the silica microparticles and prevent soil on the glass fiber fabric.

In addition, in this embodiment, by separating the attachment step and the fiber-opening step, a large amount of silica microparticles are not used in the fiber-opening step, thus contributing to a reduction in stress applied to the glass fiber fabric. Thus, it is possible to reduce a risk that defects in appearance occur in the glass fiber fabric. Particularly, when a thin glass fiber fabric in which mass per unit area is 110 g/m$^2$ or less is produced, bowed filling occurs easily when large stress is applied to the glass fiber fabric in the fiber-opening treatment. On the other hand, by separating the attachment step and the fiber-opening step to decrease stress applied to the glass fiber fabric in the fiber-opening step, the occurrence of bowed filling can be prevented.

In addition, in this embodiment, the attachment step and the fiber-opening step are separated, and the attachment step and the fiber-opening step are independently temperature-controlled, thereby contributing to the maintenance of an apparatus as well. In other words, aggregates of the silica microparticles generated by insufficient liquid temperature control may damage the apparatus by precipitating in the piping driving portion and the like of the apparatus. Therefore, in the case of continuous operation, it is necessary to prevent the aggregation of the silica microparticles by temperature control by a cooling apparatus. In addition, in the case of intermittent operation, the prevention of the occurrence of the aggregation of the silica microparticles by temperature control is incomplete, and therefore, it is necessary to closely perform the daily check of the apparatus. On the other hand, the independent temperature control of the attachment step and the fiber-opening step can reduce the risk of causing damage to the piping driving portion and the like without imposing such burdens.

Next, in the silane coupling agent treatment step of step S5, the surface treatment of the glass fiber fabric having silica microparticles adhered thereon is performed using a silane coupling agent. Affinity between the glass fiber fabric having silica microparticles adhered thereon and a resin improves by this surface treatment.

The silane coupling agent used in the silane coupling agent treatment step is not particularly limited, and examples of the silane coupling agent include epoxysilanes, aminosilanes, or cationic silanes.

The silane coupling agent attached on the glass fiber fabric having silica microparticles adhered thereon is preferably 0.01 to 5 parts by mass with respect to 100 parts by mass of the glass fiber yarns.

In conventional processes for the production of glass fiber fabrics, in a silane coupling agent treatment, clearances between glass filaments widened by a fiber-opening treatment tend to be narrowed. On the other hand, in the production process in this embodiment, the silica microparticles enter between the glass filaments and are fused, and therefore, clearances between the glass filaments are also prevented from being narrowed in the silane coupling agent treatment step. Therefore, the resin impregnation property of the glass fiber fabric having silica microparticles adhered thereon is maintained.

Next, in the fiber-opening step after the heating step of step S6, a fiber-opening treatment is provided to the glass fiber fabric having silica microparticles adhered thereon after the heat treatment. For this fiber-opening treatment, for example, the fiber-opening treatments described for the fiber-opening step of step S3 can be performed. Among them, the fiber-opening treatment with a water jet is preferable in that a possibility that problems in appearance, such as bowed filling, occur is small.

In this embodiment, by performing the fiber-opening step after the heating step, after the silane coupling agent treatment step, the uniform attachment of the silane compound on the glass fiber fabric having silica microparticles adhered thereon is promoted, contributing to an improvement in the heat resistance of the glass fiber fabric having silica microparticles adhered thereon. In addition, the compound excessively attached on the glass fiber fabric having silica microparticles adhered thereon in the silane coupling agent treatment step can be washed away in the subsequent fiber-opening treatment. Therefore, the resin impregnation property of the glass fiber fabric having silica microparticles adhered thereon improves further.

In the glass fiber fabric having silica microparticles adhered thereon produced by the production process according to this embodiment, the fusion rate of the silica microparticles is preferably 60% or more, more preferably 90% or more, further preferably 95% or more, and particularly preferably 99% or more. The fusion rate of the silica microparticles is high, and thus, the silica microparticles do not decrease due to detachment or the like, and the excellent resin impregnation property of the glass fiber fabric having silica microparticles adhered thereon is maintained.

In addition, the glass fiber fabric having silica microparticles adhered thereon according to this embodiment in which silica microparticles are fused on the glass filament surfaces of a glass fiber fabric to adhere the silica microparticles may comprise silica microparticles attached on the glass filament surfaces without being fused, and the fusion rate of the silica microparticles is preferably 60% or more, more preferably 90% or more, further preferably 95% or more, and particularly preferably 99% or more. The fusion rate of the silica microparticles is high, and thus, the excellent resin impregnation property of the glass fiber fabric having silica microparticles adhered thereon according to this embodiment is maintained.

Here, the fusion rate of the silica microparticles is obtained by the following procedure. First, the number of silica microparticles that the glass fiber fabric having silica microparticles adhered thereon adheres on the glass filament surfaces, A, is measured by an SEM. Then, in pure water at 20° C., in a state in which an ultrasonic vibrator is spaced from the glass fiber fabric having silica microparticles adhered thereon by 10 cm, an ultrasonic wave having a frequency of 50 kHz generated from the ultrasonic vibrator is allowed to act on the glass fiber fabric having silica microparticles adhered thereon for 1 minute. Then, the number of silica microparticles that the glass fiber fabric having silica microparticles adhered thereon retains on the glass filament surfaces, B, is measured by the SEM. Then, by dividing B by A and expressing a result by percentage, the fusion rate of the silica microparticles is obtained.

In addition, the glass fiber fabric having silica microparticles adhered thereon produced by the production process according to this embodiment or the glass fiber fabric having silica microparticles adhered thereon according to this embodiment has a mass per unit area of 110 g/m² or less, more preferably 50 g/m² or less, in terms of applications for reinforcing materials for thin fiber-reinforced molded resin articles. The mass per unit area of the glass fiber fabric having silica microparticles adhered thereon is a value including the mass of the silica microparticles attached or fused on the glass fiber fabric having silica microparticles adhered thereon, and the mass of the silane coupling agent attached on the glass fiber fabric having silica microparticles adhered thereon.

Particularly, in terms of improvements in resin impregnation property and smoothness, it is preferable that the mass per unit area of the glass fiber fabric having silica microparticles adhered thereon is smaller because the extent of resin impregnation property improvement is high, and the widening effect of the fiber-opening treatment is large. As described in detail in Examples in a later part, it is preferable that the mass per unit area of the glass fiber fabric having silica microparticles adhered thereon is 110 g/m² or less because resin impregnation time is reduced to 25% or less compared with a case where there are no attachment and fusion of silica microparticles, and the glass fiber yarns are widened by 15% or more by undergoing the fiber-opening step. Further, it is more preferable that its mass per unit area is 50 g/m² or less because resin impregnation time is reduced to 5% or less compared with a case where there are no attachment and fusion of silica microparticles, and the glass fiber yarns are widened by 25% or more by undergoing the fiber-opening step.

In addition, on the glass fiber fabric having silica microparticles adhered thereon produced by the production process according to this embodiment or the glass fiber fabric having silica microparticles adhered thereon according to this embodiment, 0.001 to 1 part by mass of the silica microparticles are preferably attached or fused with respect to 100 parts by mass of the glass fiber yarns, and 0.01 to 0.1 parts by mass of the silica microparticles are more preferably attached or fused. The silica microparticles in this range are attached or fused, and thus, improvements in resin impregnation property and smoothness due to the fact that the silica microparticles ensure clearances between the glass filaments are achieved.

Further, on the glass fiber fabric having silica microparticles adhered thereon produced by the production process according to this embodiment or the glass fiber fabric having silica microparticles adhered thereon according to this embodiment, 0.01 to 1 part by mass of the silane coupling agent may be attached with respect to 100 parts by mass of the glass fiber yarns.

In addition, it is preferable that in the glass fiber fabric having silica microparticles adhered thereon produced by the production process according to this embodiment or the glass fiber fabric having silica microparticles adhered thereon according to this embodiment, its mass per unit area, $X$ g/m², and air permeability, $Y$ cm³·cm⁻²·s⁻¹, satisfy a condition represented by the following formula (1).

$$0 < X \times (Y)^{1/2} \leq 300 \tag{1}$$

Here, air permeability can be measured by the air permeability test process of JIS L 1096. As the widening of the warp and the weft in the fiber-opening step increases, air permeability decreases, and therefore, air permeability is an indicator of the magnitude of smoothness. Formula (1) corrects a tendency that air permeability increases when the mass per unit area of the glass fiber fabric is small, considering that a glass fiber fabric that is thinner and has high smoothness is suitable for a reinforcing material for a thin fiber-reinforced molded resin article. In other words, glass fiber fabrics having silica microparticles adhered thereon in which smoothness is high but air permeability increases because the glass fiber fabrics are very thin and lightweight are included in glass fiber fabrics having silica microparticles adhered thereon that satisfy the condition represented by formula (1).

Particularly, in terms of an improvement in resin impregnation property, it is preferable that the value of $X \times (Y)^{1/2}$ described above is smaller because the extent of resin impregnation property improvement is high. As described in detail in Examples in a later part, it is preferable that this value of the glass fiber fabric having silica microparticles supported thereon is 300 or less because resin impregnation time is reduced to 25% or less compared with a case where there are no attachment and fusion of silica microparticles. Further, it is more preferable that this value of the glass fiber fabric having silica microparticles supported thereon is 200 or less because resin impregnation time is reduced to 5% or less compared with a case where there are no attachment and fusion of silica microparticles.

By using the glass fiber fabric having silica microparticles adhered thereon produced by the production process according to this embodiment or the glass fiber fabric having silica microparticles adhered thereon according to this embodiment, as a reinforcing material, impregnating this with a resin, and curing the resin, a fiber-reinforced molded resin article comprising the glass fiber fabric having silica microparticles adhered thereon as a reinforcing material can be produced.

A process for the impregnation of the glass fiber fabric having silica microparticles adhered thereon with a resin is not particularly limited, and can be performed by a publicly known process.

The resin used in the production of this fiber-reinforced molded resin article is not particularly limited, and examples of the resin include the following.

Examples of thermosetting resins for printed board applications include epoxy resins, thermosetting modified polyphenylene ether resins, thermosetting polyimide resins, urea resins, allyl resins, silicon resins, benzoxazine resins, phenolic resins, unsaturated polyester resins, bismaleimide triazine resins, alkyd resins, furan resins, melamine resins, polyurethane resins, and aniline resins.

In addition, examples of thermoplastic resins for printed board applications include polyphenylene ether resins, functional group-modified polyphenylene ether resins, alicyclic hydrocarbon resins, thermoplastic polyimide resins, polyether ether ketone (PEEK) resins, polyether sulfone resins, polyamideimide resins, polyesterimide resins, polyester resins, polyolefin resins, polystyrene resins, polyamide resins, polyvinyl acetal resins, polyvinyl alcohol resins, polyvinyl acetate resins, poly(meth)acrylate resins, and polyoxymethylene resins.

On the other hand, examples of thermosetting resins for transparent sheet and display material applications include epoxy resins, phenolic resins, melamine resins, and polyester resins.

In addition, examples of thermoplastic resins for transparent sheet and display material applications include polyethylene, polypropylene, polymethyl methacrylate, polycarbonate, polytetrafluoroethylene, polyvinyl chloride, polyvinylidene chloride, polyether sulfone, polyphenylene oxide, or blends or block or graft copolymers thereof.

A process for curing the resin with which the glass fiber fabric having silica microparticles adhered thereon is impregnated is not particularly limited, and can be performed by a publicly known process.

A preferred embodiment of the present invention has been described above, but the present invention is not limited to the above embodiment, and various modifications can be made. For example, in the above embodiment, it has been described that the silane coupling agent treatment step (step S5) or/and the fiber-opening treatment after the heating step (step S6) are performed after the heating step (step S4), but the silane coupling agent treatment step (step S5) and the fiber-opening treatment after the heating step (step S6) need not be performed after the heating step (step S4).

EXAMPLES

Preferred Examples of the present invention will be described below, but the present invention is not limited to the following Examples.

Example 1

(Glass Fiber Fabric)

As a glass fiber fabric, a glass fiber fabric in which the attachment amount of a sizing agent mainly comprising starch was 1 part by mass with respect to 100 parts by mass of glass fiber yarns (manufactured by NITTO BOSEKI CO., LTD.; WEA1078) was used.

Here, in the glass fiber yarn of this glass fiber fabric, its filament composition was E-glass, filament diameter was 5 μm, the number of filaments was 200, and count was 11.2 tex. In addition, this glass fiber fabric was one in which glass fiber yarns were plain-woven, and the weaving density of the glass fiber yarns was 53 yarns/25 mm for the warp and 53 yarns/25 mm for the weft, and its mass per unit area was 48 g/m².

(Attachment Step)

The glass fiber fabric was immersed in a silica microparticle attachment vessel containing an aqueous dispersion of silica microparticles to attach the silica microparticles to obtain a fabric having silica microparticles attached thereon.

As the aqueous dispersion of silica microparticles, a solution in which 0.2% by mass of silica microparticles having a volume average particle diameter of 100 nm (manufactured by Nissan Chemical Industries, Ltd.; SNOWTEX) were dispersed in water was used. In addition, the liquid temperature of the aqueous dispersion of silica microparticles was 20° C.

As the silica microparticle attachment vessel, one comprising two widening rollers was used. The two widening rollers were disposed so that a minor angle formed by the glass fiber fabric being bended by these was about 100 degrees.

The immersion in the silica microparticle attachment vessel and the attachment of the silica microparticles were specifically performed by passing the glass fiber fabric through the silica microparticle attachment vessel containing the aqueous dispersion of silica microparticles over 2 to 3 seconds while applying a tension of 240 N to 250 N per unit width in the movement direction of the glass fiber fabric and bending the glass fiber fabric by the widening rollers disposed in the liquid in the silica microparticle attachment vessel.

(Fiber-opening Step)

A fiber-opening treatment with a vibrowasher in water was provided to the fabric having silica microparticles attached thereon obtained by the attachment step, to obtain a fiber-opened fabric.

The vibration frequency of a pressure wave provided by the vibrowasher to the glass fiber fabric on which the sizing agent was attached was 150 Hz, and water temperature was 40° C.

(Heating Step)

By performing a heat treatment on a roll of the fiber-opened fabric that was obtained by the fiber-opening step and underwent washing and squeezing, the sizing agent was removed to obtain a glass fiber fabric having silica microparticles adhered thereon.

The heat treatment was specifically performed by heating at 400° C. for 48 hours.

(Silane Coupling Agent Treatment Step)

A surface treatment using a silane coupling agent was provided to the glass fiber fabric having silica microparticles adhered thereon obtained through the heating step.

As the silane coupling agent, N-β-(N-vinylbenzylamino) ethyl-aminopropylmethoxysilane was used.

The surface treatment was specifically performed by immersing the glass fiber fabric having silica microparticles adhered thereon in a silane coupling agent solution having a silane coupling agent concentration of 0.3% by mass prepared at a pH of 3.5, and squeezing the glass fiber fabric having silica microparticles adhered thereon.

(Fiber-opening Step after Heating Step)

After the silane coupling agent treatment step, a fiber-opening treatment in which a water jet was allowed to act on the glass fiber fabric having silica microparticles adhered thereon was performed.

The fiber-opening treatment was specifically performed by jetting a high pressure water flow at 40° C. having a pressure of 2 MPa to the glass fiber fabric having silica microparticles adhered thereon.

In the finally obtained glass fiber fabric having silica microparticles adhered thereon, with respect to 100 parts by mass of the glass fiber yarns, the attachment or fusion amount of the silica microparticles was 0.01 parts by mass, and the attachment amount of the silane coupling agent was 0.1 parts by mass.

Example 2

A glass fiber fabric having silica microparticles adhered thereon was produced as in Example 1 except that as the glass fiber fabric, a glass fiber fabric on which a sizing agent was attached as in Example 1 (manufactured by NITTO BOSEKI CO., LTD.; WEA1037) was used.

Here, in the glass fiber yarn of this glass fiber fabric, its filament composition was E-glass, filament diameter was 4.5 μm, the number of filaments was 100, and count was 4.2 tex. In addition, this glass fiber fabric was one in which glass fiber yarns were plain-woven, and the weaving density of the glass fiber yarns was 69 yarns/25 mm for the warp and 72 yarns/25 mm for the weft, and its mass per unit area was 24 g/m$^2$.

In the finally obtained glass fiber fabric having silica microparticles adhered thereon, with respect to 100 parts by mass of the glass fiber yarns, the attachment or fusion amount of the silica microparticles was 0.01 parts by mass, and the attachment amount of the silane coupling agent was 0.1 parts by mass.

Example 3

A glass fiber fabric having silica microparticles adhered thereon was produced as in Example 1 except that as the glass fiber fabric, a glass fiber fabric on which a sizing agent was attached as in Example 1 (manufactured by NITTO BOSEKI CO., LTD.; WEA116E) was used.

Here, in the glass fiber yarn of this glass fiber fabric, its filament composition was E-glass, filament diameter was 7 μm, the number of filaments was 200, and count was 22.5 tex. In addition, this glass fiber fabric was one in which the above glass fiber yarns were plain-woven, and the weaving density of the glass fiber yarns was 59 yarns/25 mm for the warp and 57 yarns/25 mm for the weft, and its mass per unit area was 104 g/m$^2$.

In the finally obtained glass fiber fabric having silica microparticles adhered thereon, with respect to 100 parts by mass of the glass fiber yarns, the attachment or fusion amount of the silica microparticles was 0.01 parts by mass, and the attachment amount of the silane coupling agent was 0.1 parts by mass.

Example 4

A glass fiber fabric having silica microparticles adhered thereon was produced as in Example 1 except that as the glass fiber fabric, a glass fiber fabric on which a sizing agent was attached as in Example 1 (manufactured by NITTO BOSEKI CO., LTD.; WEA7628) was used.

Here, in the glass fiber yarn of this glass fiber fabric, its filament composition was E-glass, filament diameter was 9 μm, the number of filaments was 400, and count was 67.5 tex. In addition, this glass fiber fabric was one in which the above glass fiber yarns were plain-woven, and the weaving density of the glass fiber yarns was 44 yarns/25 mm for the warp and 32 yarns/25 mm for the weft, and its mass per unit area was 180 g/m$^2$.

In the finally obtained glass fiber fabric having silica microparticles adhered thereon, with respect to 100 parts by mass of the glass fiber yarns, the attachment or fusion amount of the silica microparticles was 0.01 parts by mass, and the attachment amount of the silane coupling agent was 0.1 parts by mass.

Comparative Example 1

A glass fiber fabric was produced as in Example 1 except that the attachment step before the heating step was not performed, and a silica microparticle attachment step under the same conditions as the attachment step before the heating step was performed after the heating step and before the silane coupling agent treatment step.

In the finally obtained glass fiber fabric, with respect to 100 parts by mass of the glass fiber yarns, the attachment amount of the silica microparticles was 0.01 parts by mass, and the attachment amount of the silane coupling agent was 0.1 parts by mass.

Comparative Example 2

A glass fiber fabric was produced as in Example 1 except that the attachment step and the fiber-opening step before the heating step were not performed, a silica microparticle attachment step under the same conditions as the attachment step before the heating step was performed after the heating step and before the silane coupling agent treatment step, and in the fiber-opening step after the heating step, instead of the fiber-opening treatment in which a water jet was allowed to act, a fiber-opening treatment with a vibrowasher in water was performed.

In the finally obtained glass fiber fabric, with respect to 100 parts by mass of the glass fiber yarns, the attachment amount of the silica microparticles was 0.01 parts by mass, and the attachment amount of the silane coupling agent was 0.1 parts by mass.

Comparative Example 3

A glass fiber fabric was produced as in Example 1 except that the attachment step and the fiber-opening step before the heating step were not performed, and in the fiber-opening step after the heating step, instead of the fiber-opening treatment in which a water jet was allowed to act, a fiber-opening treatment with a vibrowasher in an aqueous dispersion of silica microparticles was performed.

As the aqueous dispersion of silica microparticles, a solution in which 1% by mass of silica microparticles having a volume average particle diameter of 100 nm (manufactured by Nissan Chemical Industries, Ltd.; SNOWTEX) were dispersed in water was used. In addition, the liquid temperature of the aqueous dispersion of silica microparticles was 40° C.

In the finally obtained glass fiber fabric, with respect to 100 parts by mass of the glass fiber yarns, the attachment amount of the silica microparticles was 0.01 parts by mass, and the attachment amount of the silane coupling agent was 0.1 parts by mass.

Comparative Example 4

A glass fiber fabric was produced as in Example 1 except that the attachment step was not performed.
In the finally obtained glass fiber fabric, the attachment amount of the silane coupling agent was 0.1 parts by mass with respect to 100 parts by mass of the glass fiber yarns.

Comparative Example 5

A glass fiber fabric was produced as in Example 2 except that the attachment step was not performed.
In the finally obtained glass fiber fabric, the attachment amount of the silane coupling agent was 0.1 parts by mass with respect to 100 parts by mass of the glass fiber yarns.

Comparative Example 6

A glass fiber fabric was produced as in Example 3 except that the attachment step was not performed.
In the finally obtained glass fiber fabric, the attachment amount of the silane coupling agent was 0.1 parts by mass with respect to 100 parts by mass of the glass fiber yarns.

Comparative Example 7

A glass fiber fabric was produced as in Example 4 except that the attachment step was not performed.
In the finally obtained glass fiber fabric, the attachment amount of the silane coupling agent was 0.1 parts by mass with respect to 100 parts by mass of the glass fiber yarns.

<Processes for Evaluation of Glass Fiber Fabrics>

For the respective glass fiber fabrics produced in Examples 1 to 4 and Comparative Examples 1 to 7, the evaluation of smoothness, appearance properties, resin impregnation property, and silica microparticle fusion rate was performed. In addition, for the glass fiber fabrics having silica microparticles adhered thereon in Examples 1 to 4 in which silica microparticles were fused on glass filament surfaces in the heating step, the evaluation of silica microparticle fusion properties was performed.

[Smoothness Evaluation]

The yarn width of the respective glass fiber yarns of the warp and the weft before and after the fiber-opening step and air permeability were measured.

Here, the yarn width of the glass fiber yarns and the air permeability show the widened state of the glass fiber yarns and are indicators of the smoothness of the glass fiber fabric. The air permeability was measured according to JIS L 1096.

[Appearance Properties Evaluation]

The presence or absence of bowed filling in the produced glass fiber fabric was visually evaluated.

The presence or absence of bowed filling indicates the presence or absence of problems in appearance in the glass fiber fabric. In addition, the presence or absence of bowed filling reflects the magnitude of stress on the glass fiber fabric in the fiber-opening step.

[Resin Impregnation property Evaluation]

The glass fiber fabric was impregnated with an epoxy resin varnish having a viscosity of 100 CPS, the light of an LED light was shone on the glass fiber fabric to visually observe voids between glass filaments within the glass fiber yarns, and time until the voids disappeared was measured.

The extent of the fraying of the glass fiber yarns, and the size of clearances between the glass filaments were reflected in resin impregnation property.

[Silica Microparticle Fusion Properties Evaluation]

The fusion rate of the silica microparticles was obtained by measuring the number of silica microparticles that the glass fiber fabric having silica microparticles adhered thereon adhered on the glass filament surfaces, A, by an SEM, then allowing an ultrasonic wave having a frequency of 50 kHz to act on the glass fiber fabric for 1 minute in pure water at 20° C. with spacing from an ultrasonic vibrator (BRANSONIC B1200 manufactured by BRANSON) set to 10 cm, then measuring the number of silica microparticles that the glass fiber fabric retained on the glass filament surfaces, B, by the SEM, and dividing B by A and expressing a result by percentage.

The fusion rate of the silica microparticles is an indicator of difficulty in the detachment of the silica microparticles from the glass filament surfaces.

Implementation conditions and evaluation results in the above Examples and Comparative Examples are shown in Table 1. In Comparative Example 3, instead of the attachment step, a fiber-opening treatment with a vibrowasher in an aqueous dispersion of silica microparticles was provided to attach the silica microparticles.

TABLE 1

| Implementation conditions and evaluation | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Mass per unit area (g/m$^2$) | 48 | 24 | 104 | 180 | 48 | 48 | 48 | 48 | 24 | 104 | 180 |
| Yarn width before opening step | | | | | | | | | | | |
| Warp width (μm) | 260 | 130 | 320 | 580 | 260 | 260 | 260 | 260 | 130 | 320 | 580 |
| Weft width (μm) | 260 | 180 | 350 | 580 | 260 | 260 | 260 | 260 | 180 | 350 | 580 |

TABLE 1-continued

| Implementation conditions and evaluation | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Presence or absence of opening step before heating step | Present | Present | Present | Present | Present | Absent | Absent | Present | Present | Present | Present |
| Attachment step (before/after deoiling, or absent) | Before | Before | Before | Before | After | After | Absent | Absent | Absent | Absent | Absent |
| Yarn width after opening step | | | | | | | | | | | |
| Warp width (μm) | 330 | 210 | 370 | 600 | 325 | 260 | 260 | 340 | 220 | 375 | 600 |
| Weft width (μm) | 450 | 330 | 420 | 600 | 450 | 350 | 360 | 455 | 340 | 420 | 600 |
| Air permeability (cm$^3$/cm$^2$/s) | 15.2 | 50.0 | 5.1 | 3.4 | 15.9 | 20.3 | 19.2 | 11.4 | 44.6 | 4.1 | 3.0 |
| Bowed filling | Absent | Absent | Absent | Absent | Absent | Present | Present | Absent | Absent | Absent | Absent |
| Resin impregnation time (seconds) | 12 | 12 | 60 | 300 | 120 | 110 | 140 | 270 | 360 | 270 | 480 |
| Silica microparticle fusion rate (%) | 100 | 99 | 99 | 99 | — | — | — | — | — | — | — |

<Evaluation Results of Glass Fiber Fabrics>
[Smoothness Evaluation Results]

In Examples 1 to 4, the glass fiber yarns were widened for both the warp and the weft.

From the comparison of Examples 1 to 4, as the mass per unit area decreased, the widening rate of the warp and the weft increased, and particularly, when the mass per unit area of the glass fiber fabric was 110 g/m$^2$ or less, a widening of 15% or more was confirmed, and further, when the mass per unit area was 50 g/m$^2$ or less, a widening of 25% or more was confirmed.

From the comparison of Example 1 with Comparative Example 1, it was confirmed that whether the attachment step was performed before the heating step or after the heating step, there was no large influence on widening effect and air permeability.

From the comparison of Example 1 with Comparative Examples 2 and 3, it was confirmed that performing the fiber-opening step and the attachment step before the heating step had a larger widening effect of the glass fiber yarns than performing the fiber-opening step and the attachment step after the heating step. In addition, also from the fact that the air permeability decreased, an improvement in smoothness was confirmed.

From the comparison of Examples 1 to 4 with Comparative Examples 4 to 7, it was confirmed that influence that the attachment step had on the widening of the warp and the weft and air permeability was not large.

[Appearance Properties Evaluation Results]

In Examples 1 to 4, bowed filling was not observed, and it was confirmed that stress on the glass fiber fabric in the fiber-opening step according to the present invention was not large.

In addition, from the comparison of Example 1 with Comparative Examples 2 and 3, it was confirmed that by providing the fiber-opening treatment in which stress applied to the glass fiber fabric was small, before the heating step, bowed filling was suppressed.

[Resin Impregnation Property Evaluation Results]

From the comparison of Examples 1 to 4 with Comparative Examples 4 to 7, it was confirmed that by providing silica microparticles by the attachment step, resin impregnation time was significantly reduced. Particularly, when the mass per unit area of the glass fiber fabric was 110 g/m$^2$ or less, by performing the attachment step, resin impregnation time was reduced to 25% or less of that in the cases where the attachment step was not performed, and further, when the mass per unit area was 50 g/m$^2$ or less, resin impregnation time was reduced to 5% or less of that in the cases where the attachment step was not performed. Simultaneously, when the value of X×(Y)$^{1/2}$ calculated from the mass per unit area, X g/m$^2$, and air permeability, Y cm$^3$·cm$^{-2}$·s$^{-1}$, of the glass fiber fabric was 300 or less, by performing the attachment step, resin impregnation time was reduced to 25% or less of that in the cases where the attachment step was not performed, and when this value was 200 or less, resin impregnation time was reduced to 5% or less of that in the cases where the attachment step was not performed.

From the comparison of Example 1 with Comparative Examples 1 to 3, it was confirmed that by performing the attachment step and the fiber-opening step before the heating step, an improvement in resin impregnation property was larger than in the cases where the attachment step and the fiber-opening step were performed after the heating step.

[Silica Microparticle Fusion Properties Evaluation Results]

From Examples 1 to 4, it was confirmed that the fusion rate of the silica microparticles of the glass fiber fabrics having silica microparticles adhered thereon obtained by the process for the production of a glass fiber fabric having silica microparticles adhered thereon according to the present invention was extremely high. From this result, it was confirmed that by performing the heating step after the attachment step and the fiber-opening step, most of the silica microparticles attached on the glass fiber fabric were fused on the glass filament surfaces.

From the above evaluation results, it was confirmed that the glass fiber fabrics having silica microparticles adhered thereon obtained by the process for the production of a glass fiber fabric having silica microparticles adhered thereon according to the present invention were excellent in any of resin impregnation property, smoothness, and appearance. In addition, it was confirmed that they were glass fiber fabrics in which most of silica microparticles present on glass filament surfaces were fused to adhere the silica microparticles.

<Effect of Liquid Temperature Control>

Resin impregnation property, smoothness, and appearance properties were compared between a case where the temperatures of the attachment step and the fiber-opening step were each independently controlled at an optimal temperature and cases where the temperatures of the attachment step and the fiber-opening step were uniformly controlled at either optimal temperature.

Example 5

A glass fiber fabric having silica microparticles adhered thereon was produced as in Example 1 except that the water temperature of the fiber-opening step was set to 70° C.

In the finally obtained glass fiber fabric having silica microparticles adhered thereon, with respect to 100 parts by mass of the glass fiber yarns, the attachment or fusion amount of the silica microparticles was 0.01 parts by mass, and the attachment amount of the silane coupling agent was 0.1 parts by mass.

Example 6

A glass fiber fabric having silica microparticles adhered thereon was produced as in Example 1 except that the liquid temperature of the attachment step was set to 70° C.

In the finally obtained glass fiber fabric having silica microparticles adhered thereon, with respect to 100 parts by mass of the glass fiber yarns, the attachment or fusion amount of the silica microparticles was 0.02 parts by mass, and the attachment amount of the silane coupling agent was 0.1 parts by mass.

Example 7

A glass fiber fabric having silica microparticles adhered thereon was produced as in Example 1 except that the water temperature of the fiber-opening step was set to 20° C.

In the finally obtained glass fiber fabric having silica microparticles adhered thereon, with respect to 100 parts by mass of the glass fiber yarns, the attachment or fusion amount of the silica microparticles was 0.01 parts by mass, and the attachment amount of the silane coupling agent was 0.1 parts by mass.

For Examples 5 to 7, evaluation was performed as in Table 1 for the same evaluation items as Table 1. Regarding soil derived from aggregates of the silica microparticles, the presence or absence of white soil accompanying the aggregation of the silica microparticles was visually evaluated. Evaluation results are shown in Table 2.

TABLE 2

| Implementation conditions and evaluation | | Example 5 | Example 6 | Example 7 |
|---|---|---|---|---|
| Attachment step liquid temperature (° C.) | | 20 | 70 | 20 |
| Opening step liquid temperature (° C.) | | 70 | 70 | 20 |
| Yarn width after opening step | Warp width (μm) | 345 | 350 | 325 |
| | Weft width (μm) | 460 | 460 | 435 |
| Silica microparticle aggregation soil | | Absent | Present | Absent |
| Resin impregnation time | | 10 | 8 | 15 |

From the comparison of Example 5 with Examples 6 and 7, it was confirmed that by controlling the liquid temperatures of the attachment step and the fiber-opening step each independently at an optimal temperature, a glass fiber fabric having silica microparticles adhered thereon in which resin impregnation property, smoothness, and appearance properties were collectively better was obtained.

<Making of Fiber-Reinforced Molded Resin Articles>

Fiber-reinforced molded resin articles comprising the glass fiber material having silica microparticles adhered thereon in Example 1 and the glass fiber fabrics in Comparative Examples 1 to 4 as a reinforcing material, and comprising an epoxy resin as a matrix resin were made.

Specifically, the glass fiber fabric was impregnated with an epoxy resin for 10 seconds, an excessive resin component was removed by squeeze rollers, and then, the glass fiber fabric was dried at 130° C. to volatize a solvent component to make a prepreg. Then, the prepreg was molded by a vacuum press under the pressurization and heating conditions of 180° C., 20 kg/cm², and 90 minutes to make a fiber-reinforced molded resin article.

In the fiber-reinforced molded resin article comprising the glass fiber fabric having silica microparticles adhered thereon in Example 1 as a reinforcing material, voids could not be visually confirmed. On the other hand, in the fiber-reinforced molded resin articles comprising the glass fiber fabrics in Comparative Examples 1 to 4 as a reinforcing material, voids were visually confirmed.

From the results, it was confirmed that by using a glass fiber fabric having silica microparticles adhered thereon, having high resin impregnation property, a fiber-reinforced molded resin article having a small amount of voids could be easily produced.

INDUSTRIAL APPLICABILITY

A glass fiber fabric having silica microparticles adhered thereon that is excellent in any of resin impregnation property, smoothness, and appearance properties can be produced by the process for the production of a glass fiber fabric having silica microparticles adhered thereon according to the present invention. This glass fiber fabric having silica microparticles adhered thereon is preferred for a reinforcing material for a thin fiber-reinforced molded resin article. A fiber-reinforced molded resin article comprising the glass fiber fabric having silica microparticles adhered thereon as a reinforcing material can be utilized for printed boards, transparent sheet materials, and the like.

The invention claimed is:

1. A glass fiber fabric having silica microparticles adhered thereon in which the silica microparticles are fused on glass filament surfaces of the glass fiber fabric to adhere the silica microparticles, the glass fiber fabric having a silane coupling agent attached thereon.

2. The glass fiber fabric having silica microparticles adhered thereon according to claim 1, wherein a mass per unit area of the glass fiber fabric having silica microparticles adhered thereon is 110 g/m² or less.

3. The glass fiber fabric having silica microparticles adhered thereon according to claim 1, wherein a mass per unit area, X g/m², and air permeability, Y cm³·cm⁻²·s⁻¹, of the glass fiber fabric having silica microparticles adhered thereon satisfy a condition of $0 < X \times (Y)^{1/2} \leq 300$.

4. A fiber-reinforced molded resin article comprising the glass fiber fabric having silica microparticles adhered thereon according to claim 1 as a reinforcing material.

5. The glass fiber fabric having silica microparticles adhered thereon according to claim 1, wherein the fusion rate of the silica microparticles is 90% or more.

6. The glass fiber fabric having silica microparticles adhered thereon according to claim 1, wherein 0.01 to 1 part by mass of the silane coupling agent with respect to 100 parts by mass of glass fiber yarns forming the glass fiber fabric having silica microparticles adhered thereon is attached to the glass fiber fabric.

7. A process for production of a glass fiber fabric having silica microparticles adhered thereon in which silica microparticles are attached or fused on glass filament surfaces of a glass fiber fabric to adhere the silica microparticles, comprising:
- an attachment step of immersing the glass fiber fabric in which a sizing agent is attached on the glass filaments, in an aqueous dispersion of silica microparticles to attach the silica microparticles on the glass filament surfaces of the glass fiber fabric;
- a fiber-opening step of providing a fiber-opening treatment to the glass fiber fabric on which the silica microparticles are attached by the attachment step; and
- a heating step of heat-treating the glass fiber fabric to which the fiber-opening treatment is provided by the fiber-opening step, to fuse some or all of the silica microparticles attached by the attachment step, on the glass filament surfaces of the glass fiber fabric.

8. The process for production of a glass fiber fabric having silica microparticles adhered thereon according to claim 7, wherein a fusion rate of the silica microparticles in the glass fiber fabric having silica microparticles adhered thereon is 60% or more.

9. The process for production of a glass fiber fabric having silica microparticles adhered thereon according to claim 7, wherein the fiber-opening treatment provides at least one of a fiber-opening treatment with a water jet, a fiber-opening treatment with a vibrowasher, and a fiber-opening treatment with an ultrasonic wave.

10. The process for production of a glass fiber fabric having silica microparticles adhered thereon according to claim 7, wherein a mass per unit area of the glass fiber fabric having silica microparticles adhered thereon is 110 g/m$^2$ or less.

* * * * *